United States Patent [19]

Gotoh et al.

[11] Patent Number: 5,062,306
[45] Date of Patent: Nov. 5, 1991

[54] APPARATUS FOR DETECTING TORQUE OF ROTATING SHAFT

[75] Inventors: Shigeyuki Gotoh; Kazunori Yokota; Isao Suzuki, all of Kariya, Japan

[73] Assignee: Kabushiki Kaisha Toyoda Jidoshokki Seisakusho, Kariya, Japan

[21] Appl. No.: 510,005

[22] Filed: Apr. 17, 1990

[30] Foreign Application Priority Data

Apr. 20, 1989 [JP] Japan .................................. 1-101157
Apr. 24, 1989 [JP] Japan .................................. 1-104128

[51] Int. Cl.$^5$ .............................................. G01L 3/10
[52] U.S. Cl. ............................................. 73/862.33
[58] Field of Search ................................. 73/862.33

[56] References Cited

U.S. PATENT DOCUMENTS 3,906,787  9/1975  Wingbermuhle ............... 73/862.33
4,637,265  1/1987  Fiori, Jr. ...................... 73/862.33

FOREIGN PATENT DOCUMENTS 0317731  12/1988  Japan ............................ 73/862.36
0317732  12/1988  Japan ............................ 73/862.36

Primary Examiner—Charles A. Ruehl
Attorney, Agent, or Firm—Brooks Haidt Haffner & Delahunty

[57] ABSTRACT

A torque detecting apparatus comprises an annular bobbinless sensor coil disposed on a rotatable shaft, and a position adjustable, non-ferromagnetic metal core member disposed adjacent the sensor coil. When the shaft is twisted, the core member moves in a hollow space defined by the sensor coil to thereby change inductance thereof in accordance with angular displacement between the sensor coil and the core member. A detecting part is disposed in opposition to a solenoid coil wound on the shaft with a gap therebetween for detecting the angular displacement in terms of a change in an oscillation frequency. A sensor set is constituted by the sensor coil and the metal core. A pair of sensor sets may be disposed, wherein one sensor set is so connected that inductance of the associated sensor coil is decreased while the other sensor set is so connected that inductance of the associated sensor coil is increased. Difference or ratio between the two oscillation frequencies may be inputted to a resonance circuit.

19 Claims, 16 Drawing Sheets

F I G. 18
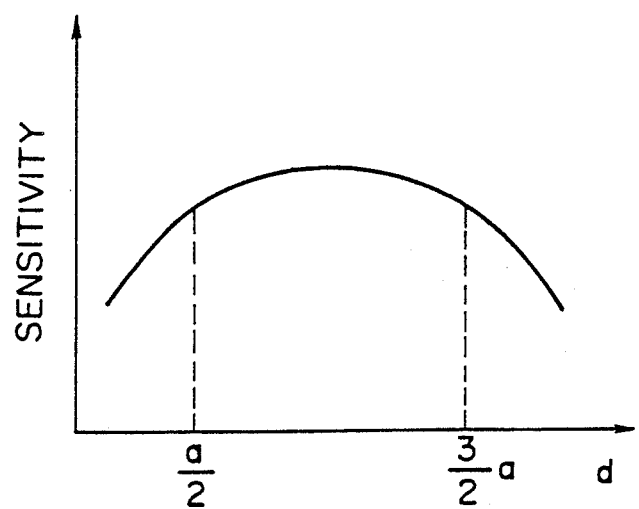
F I G. 19
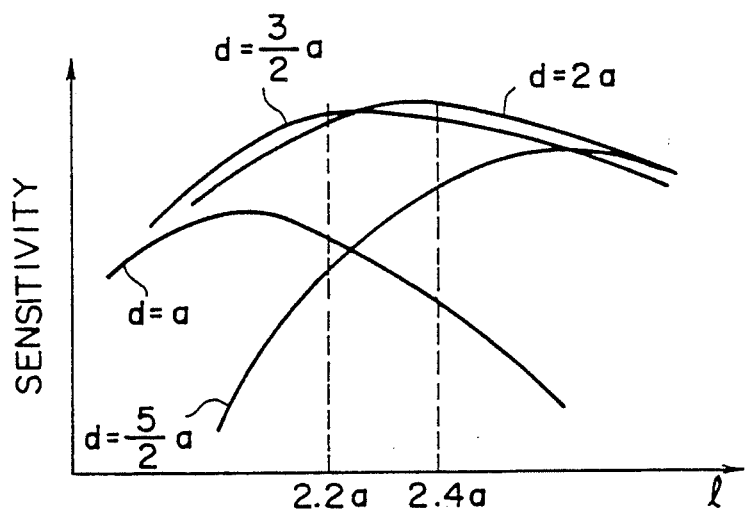

APPARATUS FOR DETECTING TORQUE OF ROTATING SHAFT

BACKGROUND OF THE INVENTION

1. Field of the Invention

The present invention relates to a torque detecting apparatus which is capable of measuring, in a contactless manner and with high accuracy, torque applied to rotating shafts employed in various rotary machines such as, for example, steering shafts of motor vehicles, robot arms and the like.

2. Description of the Prior Art

As a means for measuring torque applied to a rotating shaft, there has been proposed a torque sensor of such a structure as shown in FIG. 24 of the accompanying drawings. In this conjunction, reference may be made to JP-A-63-36124 (Japanese Patent Application Laid-Open No. 36124/1988). As can be seen in FIG. 24, this prior art torque sensor is composed of three ring-shaped cores (magnetic iron cores) 91, 92 and 93 disposed coaxially with a twistable shaft S subjected to an amount of torsion which is variable as a function of magnitude of torque applied to the shaft. The two inner ring-shaped cores 92 and 93 are connected to the twistable shaft S at two different positions by means of respective brackets 921 and 931, wherein both the ring-shaped cores 92 and 93 have the opposite surfaces formed with indentations 92A, 92B and 93A, 93B, respectively, while the outer ring core 91 is provided with stationarily supported sensor coils 91A and 91B. In operation, the twistable shaft S undergoes torsion upon application of torque, whereby the opposing surface areas of the indentations 92A, 92B and 93A, 93B formed in the ring-shaped cores 92 and 93 are changed, causing a corresponding change in the number of lines of magnetic force 90. Consequently, inductance at the sensor coils 91A and 91B is caused to very correspondingly. Since the change in inductance corresponds to the magnitude of applied torque, it is possible to detect the latter in terms of the change in inductance.

FIG. 25 shows a torque detecting apparatus developed by the same applicant as the present application and disclosed in JP-A-62-263490. The torque detecting apparatus comprises a driving shaft 1 and a driven shaft 2 coupled together by an elastic member 10 disposed therebetween, a resonance circuit including sensor coils 99A and 99B, and a detection circuit adapted to cooperate with the resonance circuit. More specifically, the sensor coils 99A and 99B are mounted on the driving shaft 1 and the driven shaft 2, respectively, in opposition to each other. A solenoid coil 95 is wound around the driving shaft 1 and connected in series to the sensor coils 99A and 99B through a capacitor 98 to thereby constitute a resonance circuit. Additionally, an input coil 96 and an output coil 97 which constitute the detection circuit mentioned above are disposed along the outer periphery of the solenoid coil 95 with a distance therefrom. Each of the sensor coils 99A and 99B is constituted by a core of a magnetic material and an electrically conductive wire wound around the core. This torque detecting apparatus operates in the manner mentioned below. When an angular displacement takes place between the driving shaft 1 and the driven shaft 2 upon application of torque, the opposing surface areas of the sensor coils 99A and 99B are changed, resulting in a corresponding change in the number of lines of magnetic force, whereby mutual inductance of the sensor coils is caused to change, involving a change in the synthesized inductance. Thus, the magnitude of torque can be detected in terms of the corresponding change in inductance.

However, the first torque sensor in which three ring-shaped cores are employed suffers a problem in that there is temperature dependence in the inductance because a core of magnetic material is employed. In this conjunction, it is noted that although the temperature dependency at the zero point can be compensated for by virtue of a differential detecting method as adopted, the temperature dependency of the sensitivity of the torque sensor is too significant to be cancelled out.

On the other hand, in the case of the last torque detecting apparatus in which a pair of sensor coils are employed, two sets of circuits each having the configuration shown in FIG. 25 are connected such that the current flows through the sensor coils in the same direction in one detection circuit set and in opposite directions in the other set (i.e. in same phase and reverse phase, respectively), wherein the difference or ratio between the outputs from both sets is utilized as the output signal for the purpose of temperature compensation. However, since a core of magnetic material is used as the sensor coil, difference is found in the temperature dependency of respective coupling factors which determine the mutual inductance. Thus, it is impossible to adequately effectuate temperature compensation.

More specifically, the mutual inductance is determined by the coupling factor of the two sensor coils. However, when a core of magnetic material (such as ferrite or the like) is employed, the coupling factor also exhibits a temperature dependency according to the temperature dependency of the magnetic core permeability. Also, the temperature dependency varies depending on the direction of the coupling (same phase and reverse phase) as well as the degree of coupling (magnitude of the opposite surface areas). Accordingly, the difference (or ratio) between ouputs of the two sets of detecting circuits can not lead to satisfactory temperature compensation.

As will be understood from the above, both the known torque detecting apparatuses suffer from the susceptibility of temperature characteristics to the influence of temperature dependence.

SUMMARY OF THE INVENTION

Accordingly, it is a principal object of the present invention to provide a torque detecting apparatus which is substantially immune to the problems mentioned above and which is capable of measuring torque applied to a rotating shaft with improved accuracy in a contactless manner and which enjoys excellent temperature characteristics.

In view of the above and other objects which will be more apparent as description proceeds, there is provided according to a general aspect of the present invention a torque detecting apparatus which comprises an annular sensor coil that does not incorporate a bobbin and which is disposed on a rotatable shaft to which torque is applied, and a non-ferromagnetic, position adjustable metal core member disposed in the vicinity of the sensor coil, wherein upon twisting of the rotatable shaft due to application of torque, the metal core member moves within the hollow space defined by the sensor coil to thereby give rise to a relative angular displacement between the sensor coil and the metal core member and hence a corresponding change in inductance of the sensor coil. The change of inductance is utilized as a signal representing the magnitude of torque applied to the rotatable shaft.

In this torque detecting apparatus, a capacitor and a solenoid coil wound on the rotatable shaft are connected in series to each other and secured onto the rotatable shaft. The sensor coil, the capacitor and the solenoid coil are connected to one another to thereby constitute a resonance circuit. A detection circuit constituted by an input coil and an output coil each constituted by a magnetic core wound with a coil is provided, wherein the input and output coils are disposed at both sides of the rotatable shaft in opposition to the solenoid coil with air gaps between the input and output coils and the solenoid coil, respectively. The above-mentioned resonance circuit and the detection circuit constitute an oscillation circuit capable of oscillating at a resonance frequency of the resonance circuit, whereby the relative angular displacement between the sensor coil and the metal core member which corresponds to the applied torque is detected in terms of a change in the oscillation frequency of the oscillation circuit.

One of the important features of the present invention to be noted resides in that the sensor coil formed by winding an electrically conductive wire in an annular form without using any bobbin and the metal core member movable reciprocatively within or through the hollow space defined by the sensor coil are disposed on the rotatable shaft so that inductance of the sensor coil is changed in correspondence to the angular displacement taking place between the sensor coil and the metal core member upon application of torque to the rotatable shaft, and that the detection circuit is disposed in opposition to the solenoid coil with air gaps therebetween for the purpose of detecting the angular displacement brought about by the torque in terms of a corresponding change in the oscillation frequency. The sensor coil and the metal core member constitute one sensor unit set.

The metal core member is made of a material exhibiting no ferromagnetism such as, for example, copper and preferably so disposed on the rotatable shaft as to be adjustable in respect to the position thereof for making it possible to adjust the zero point of the sensor unit.

The sensor coil and the metal core member constituting one sensor unit set are fixedly mounted on associated rotatable shaft portions, respectively, which are disposed in opposition to each other. The sensor coil and the metal core member can be displaced relative to each other in the rotating direction of the rotatable shaft assembly. By virtue of this arrangement, the metal core member by moving into or out of the hollow space defined by the sensor coil when there is angular displacement between the sensor coil and the metal core member, changes the inductance of the sensor coil correspondingly.

The sensor coil and the metal core member should preferably be of a circular cross-section as there is greater mutual inductance as compared with a rectangular cross-section.

In a further preferred embodiment of the present invention, a pair of sensor units are provided, wherein the sensor coil of one sensor unit is so connected that inductance thereof decreases, while the sensor coil of the other sensor unit is so connected that inductance thereof increases. In this case, the difference or ratio between the two oscillation frequencies may be applied to the resonance circuit as the synthesized output of the two sensor sets. In conjunction with this arrangement, it should be mentioned that the metal core member of one sensor unit is provided with a single core portion, while that of the other sensor unit is provided with two discrete core portions.

The rotatable shaft assembly includes a driving shaft and a driven shaft which are coupled to each other through an elastic member such as a leaf spring assembly. Alternatively, the shaft assembly may be implemented in an intergral structure. In the former case, the sensor coil and the metal core member are disposed in opposition to each other on mounting means fixedly secured to the driving shaft and the driven shaft, respectively. In the latter case, the sensor coil and the metal core member are disposed in opposition to each other on respective fixtures mounted on the single shaft with an appropriate distance therebetween.

The solenoid coil may be implemented by winding an electrically conductive wire on and around the outer circumferential surface of the rotatable shaft, wherein the wire is connected to the capacitor and the sensor coil to form a closed resonance circuit.

The torque detecting apparatus according to the present invention is capable of exhibiting exceedingly advantageous actions and effects in particular when it is employed for measuring in a contactless manner torque transmitted in rotary machines such as motor vehicle driving systems, steering systems or the like or when it is incorporated in these rotary machine systems for the control thereof on the basis of torque as detected.

In the torque detecting apparatus according to the invention, a relative angular displacement takes place between a driving shaft and a driven shaft or two discrete positions on the rotatable shaft upon application of torque thereto. With the occurrence of the relative angular displacement, the metal core member moves relative to the sensor coil into or out of the hollow space defined thereby. As a consequence, inductance of the sensor coil is changed because of changes in the eddy current induced in the core portion of the metal core member due to the movement thereof relative to the sensor coil.

The change in inductance in the sensor coil involves a corresponding change in the resonance frequency of the resonance circuit disposed on the rotatable shaft, as a result of which the oscillation frequency of the detecting circuit provided externally of the rotatable shaft is changed. Since the magnitude of change in inductance of the sensor coil corresponds to the magnitude of torque transmitted through the rotating shaft, it is possible to detect the magnitude of torque on the basis of the magnitude of change in the oscillation frequency.

When a pair of sensor units are provided, the difference or ratio between the outputs of these sensor units is detected, whereby measurement of torque can be achieved with an increased accuracy even for a small angular displacement between the sensor coil and the metal core member.

Since the metal core member is made of a non-ferromagnetic material according to the teaching of the present invention, magnitude of the eddy current induced in the metal core portion as well as that of the current flowing through the detecting circuit is determined only by the geometrical position of the metal core member and exhibits no temperature dependency. Thus, there can be provided a torque detecting apparatus which is excellent in respect to temperature characteristics.

Further, because the sensor coil incorporates no bobbin, a narrow air gap can be realized between the sensor coil and the metal core member. By virtue of this feature, inductance of the sensor coil can change significantly to thereby correspondingly enhance the torque detection sensitivity.

The change in the resonance frequency taking place depending on the magnitude of torque transmitted through the rotating shaft can be detected contactless by the detection unit disposed externally of the shaft. This feature also contributes to further improvement of the detection accuracy and sensitivity.

Since the signal transmission to the detecting circuit provided externally of the rotatable shaft is realized in the form of frequency transmission, a high S/N ratio and significant reduction in the power consumption of the excitation coil of the detecting unit can be achieved.

As will be appreciated from the above, there is provided according to the present invention a torque detecting apparatus which is capable of detecting, in a contactless manner, the torque transmitted through a rotating shaft with high detection sensitivity and accuracy while enjoying improved temperature characteristics. Further, with the torque detecting apparatus according to the invention, it is also possible to measure the torque applied to a shaft even in the stationary state thereof.

BRIEF DESCRIPTION OF THE DRAWINGS

A more detailed understanding of the invention may be had from the following description of the preferred embodiments thereof, given by way of example and to be read and understood in conjunction with the accompanying drawings, in which:

FIGS. 18 and 19 are views for illustrating graphically relations between relative sizes of the metal core member and sensitivity;

DESCRIPTION OF THE PREFERRED EMBODIMENTS

First Embodiment

Referring now to FIGS. 1 to 7, there is shown a first embodiment of the torque detecting apparatus according to the present invention in which a single pair of a sensor coil and a metal core member is employed to constitute a sensor unit or circuit.

Figure 1:
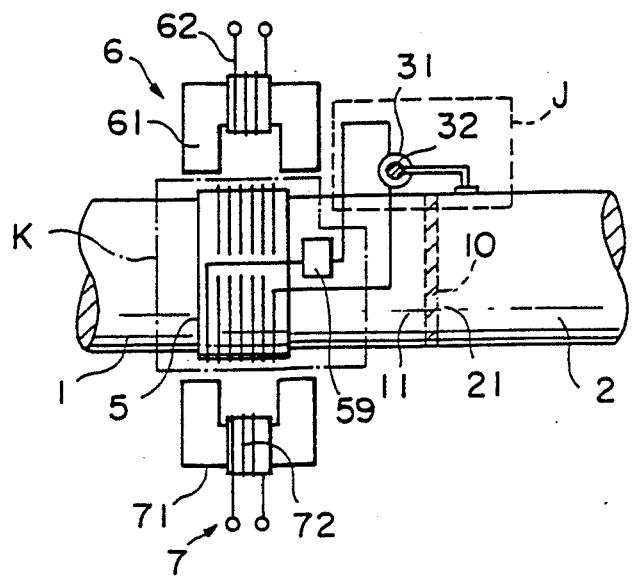
FIG. 1 is a schematic view for illustrating the concept underlying the torque detecting apparatus according to a first embodiment of the present invention.

As shown in FIG. 1, the torque detecting apparatus comprises a sensor unit J which is constituted by a sensor coil 31 and a metal core member 32 combined in a pair and mounted, respectively, on rotatable shaft portions 1 and 2 which are disposed in opposition to each other, an LC-series circuit unit K fixedly secured to the rotatable shaft portion 1, and a detection circuit unit L (FIG. 6) disposed laterally of the rotatable shaft 1, wherein the sensor circuit J and the LC-series circuit K are connected in series to each other to thereby form a resonance circuit. The circuits J, K and L cooperate to serve for torque detection.

Figure 2:
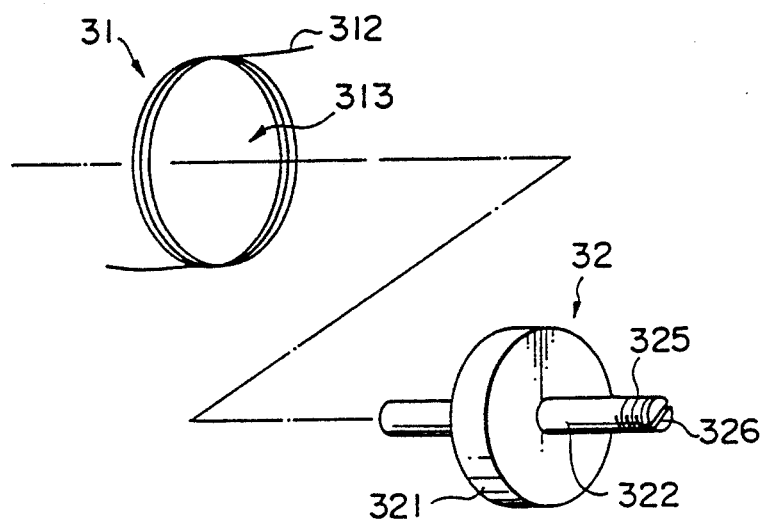
FIG. 2 is an exploded perspective view of a sensor unit of the torque detecting apparatus shown in FIG. 1.

More specifically, the rotatable shaft portions 1 and 2 are coupled to each other through an interposed elastic member 10 such as, for example, a rubber elastic member, a metal leaf spring assembly or the like. The bobbinless sensor coil 31 is formed solely by an electrically conductive wire 312 wound without using any bobbin so as to define a hollow interior space 313, as best shown in FIG. 2. This sensor coil 31 is fixedly secured to the rotatable shaft portion 1 at one end 11 thereof by means of a suitable mounting member (not shown). On the other hand, the metal core member 32 is constituted by a shaft 322 and a relatively thick disc-like core portion 321 mounted on the shaft 322 at an intermediate portion thereof, as can be seen in FIG. 2, wherein at least the core portion 321 is preferably formed of non-ferromagnetic material such as copper. The metal core member 32 is secured to the rotatable shaft portion 2 at an end 21 thereof by appropriate fitting means (not shown) in the state in which the core portion 321 is disposed within the hollow interior space 313 of the sensor coil 31.

Figure 3:
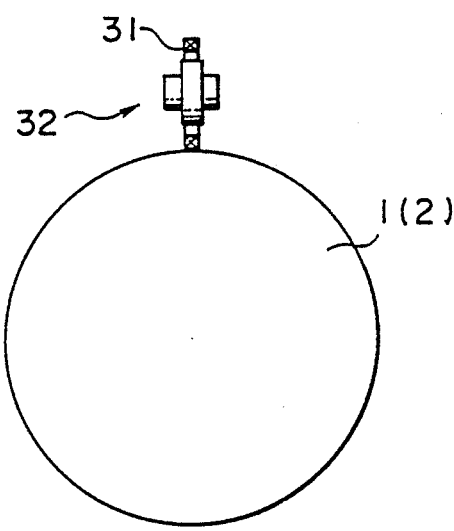
FIGS. 3 and 4 are views for illustrating a relative angular displacement between a sensor coil and a metal core member in the torque detecting apparatus shown in FIG. 1.
Figure 4:
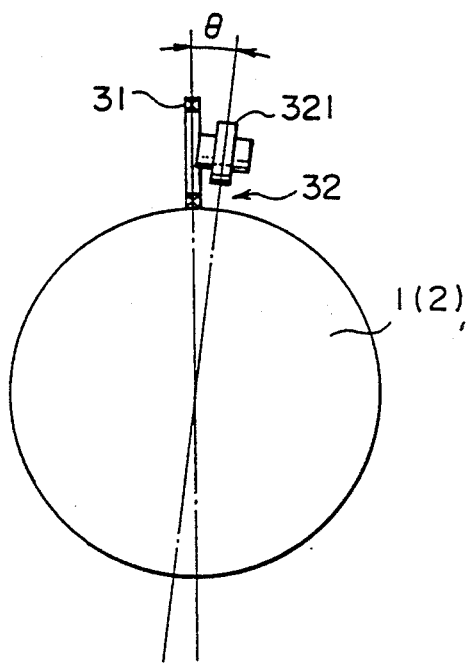

The metal core member 32 is fixedly mounted on the rotatable shaft portion 2 by means of a fitting member (not shown) which is adapted to threadedly engage a threaded end portion 325 of the shaft 322. The sensor coil 31 and the metal core member 32 are disposed such that the disc-like core portion 321 of the metal core member 32 is positioned at the center of the sensor coil 31 as viewed in the axial direction thereof when no torque is applied to the rotatable shaft assembly (i.e. when no angular displacement occurs), as is illustrated in FIG. 3. The positional adjustment for this end may be accomplished by correspondingly rotating the shaft 322 of the metal core member 32 by means of a suitable tool such as a screw driver inserted in a slot 326 formed in the end face of the threaded portion 325 of the shaft 322 to thereby adjust the position of the threaded portion 325 relative to the fitting member (not shown).

As shown in FIG. 1, the LC-series circuit unit K constituting the resonance circuit through cooperation with the sensor circuit J is composed of a solenoid coil 5 wound circumferentially around the rotatable shaft portion 1 and a capacitor 59 connected in series to the solenoid coil 5, wherein the solenoid coil 5 and the capacitor 59 are secured onto the rotatable shaft portion 1.

Figure 5:
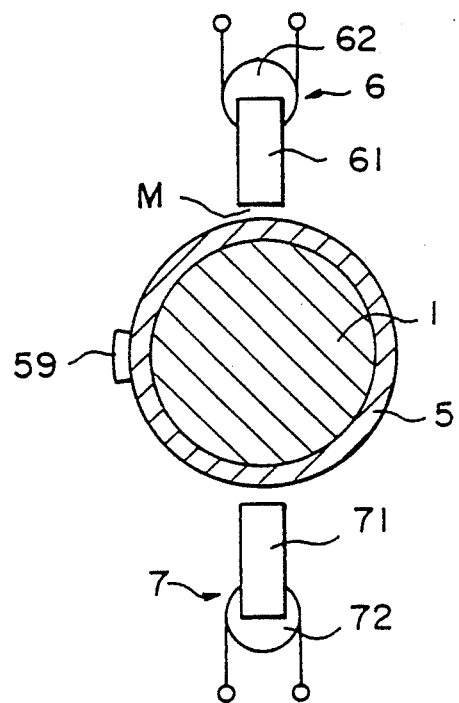
FIG. 5 is a sectional view showing an exemplary arrangement of the detecting circuit unit in the torque detecting apparatus shown in FIG. 1.

The detection circuit L for detecting the resonance frequency outputted from the solenoid coil 5 is constituted by an input coil assembly 6 connected to a driving power supply source and an output coil assembly 7 for generating a detection signal, as shown in FIGS. 1 and 5. The input coil assembly 6 is constituted by a magnetic core 61 and an electrically conductive wire 62 wound around the core 61, while the output coil assembly 7 is constituted by a magnetic core 71 and an electrically conductive wire 72 wound around the core 71. The input coil assembly or unit 6 and the output coil unit 7 are disposed in opposition to the solenoid coil 5 with air gaps M being defined between the solenoid coil 5 and the input and output coil units 6 and 7, respectively, as best shown in FIG. 5.

Figure 6:
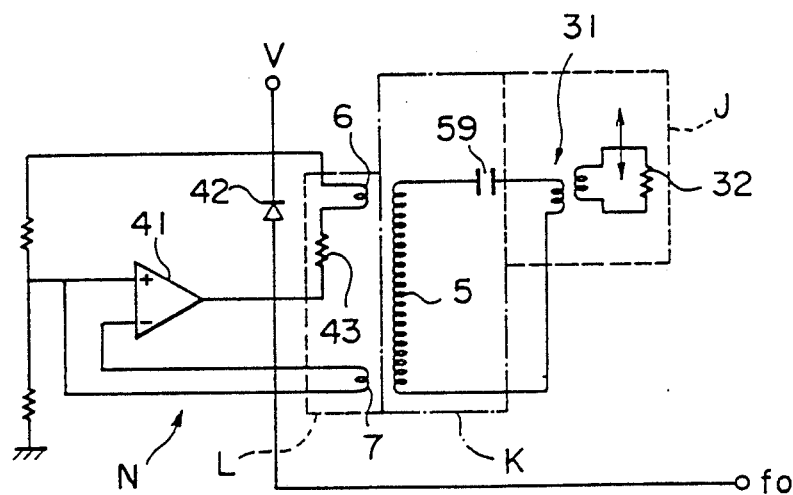
FIG. 6 is a circuit diagram showing an oscillation circuit employed in the torque detecting apparatus shown in FIG. 1.

Referring to FIG. 6, the sensor circuit J, the LC-series circuit K and the detection circuit L are electrically connected to a shaper circuit N to thereby form an oscillation circuit for producing an output signal $f_o$ which represents a resonance frequency. In FIG. 6, a reference numeral 41 denotes a comparator, 42 denotes a diode and 43 denotes a current limiter resistor which serve as major elements of the shaper circuit N. Further, a reference symbol V denotes a driving power supply.

Now, operation of the torque detecting apparatus will be elucidated on the assumption that the rotatable shaft portion 1 serves as a driving shaft with the rotatable shaft portion 2 being a driven shaft. When the driven shaft 2 is rotated by the driving shaft 1 with torque being applied thereto, the elastic member 10 interposed between these shaft portions 1 and 2 undergoes twist or torsion. As a result, an angular deviation takes place between the sensor coil 31 secured to the driving shaft 1 and the disc-like core portion 321 of the metal core member 32 mounted on the driven shaft 2 so as to be positioned within the hollow space 313 of the sensor coil 31, which deviation is represented by a relative angular displacement $\theta$ in FIG. 4.

Due to the angular displacement between the core portion 321 of the metal core member 32 and the sensor coil 31, which is accompanied with a movement (to the left or right as viewed in FIG. 3) of the disc-like core portion 321 of the metal core member 32 within the hollow space 313 defined by the detecting coil 31, an eddy current generated in the disc-like core portion 321 is changed correspondingly, causing a corresponding change in inductance of the sensor coil 31. Simultaneously, the resonance frequency of the LC-series circuit K coupled to the sensor circuit J undergoes a change, which in turn brings about a corresponding shift in the oscillation frequency in the detection circuit L and hence in the output frequency $f_o$ of the circuit shown in FIG. 6. Since the amount of change in inductance of the sensor coil 31 corresponds to the magnitude of torque as applied, it is possible to determine the applied torque on the basis of the magnitude of the change in the oscillation frequency.

In the detection circuitry L, the output signal of the solenoid coil 5 is caught by the input coil unit 6 and the output coil unit 7 to be subsequently inputted to the shaper circuit N. Parenthetically, the frequency output $f_o$ of the shaper circuit N may be derived in the form of a voltage signal by using a frequency-to-voltage converter or the like known in the art.

Figure 7:
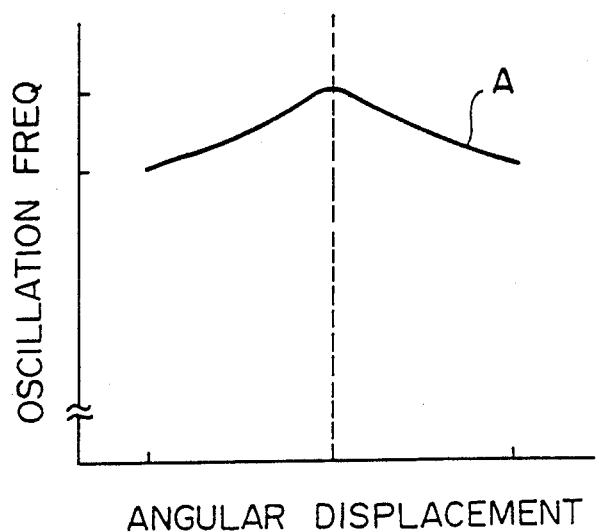
FIG. 7 is a view for illustrating graphically a relation between the angular displacement and the oscillation frequency obtained in the torque detecting apparatus shown in FIG. 1.

FIG. 7 is a view illustrating graphically, only by way of example, a relation between the relative angular displacement and the oscillation frequency by a curve A.

According to the embodiment described above in which the sensor circuit J is constituted by the sensor coil 31 defining the hollow space 313 and the metal core member 32 movable within the hollow space 313 without resorting to the use of any magnetic core, a torque detecting apparatus can be provided in which the current flowing through the detection circuit is determined only by the geometrical position of the metal core member 32 and which thus can provide excellent temperature characteristics.

Also, because the sensor coil 31 does not incorporate a bobbin, the gap between the sensor coil 31 and the disc-like metal core portion 321 can be minimized, whereby the rate of inductance change can be increased, and the sensitivity of the torque detecting apparatus can be enhanced correspondingly. Additionally, as positional adjustment of the metal core member 32 is made by using the threaded portion 325, the zero point adjustment or setting is greatly facilitated.

Further, since the change in inductance can be detected in a contactless manner as described hereinbefore, a significantly enhanced detection accuracy, as well as a high sensitivity, can be realized. Finally, signal transmission from the resonance circuit to the detection circuit through the solenoid coil can assure a high S/N ratio as well as reduced power consumption in the exciting coil of the detection circuit.

Second Embodiment

Figure 8:
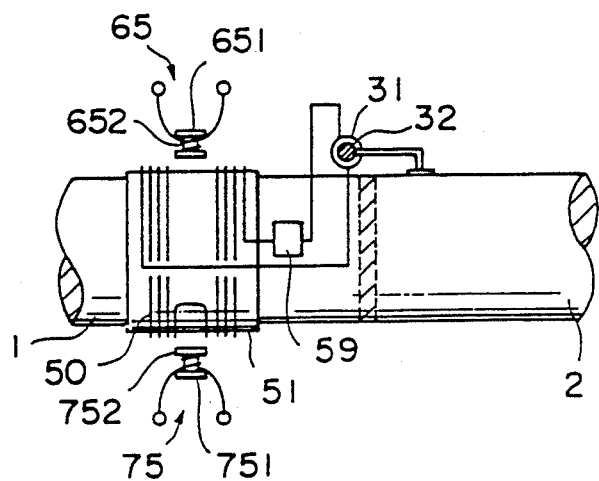
FIG. 8 is a schematic view for illustrating the concept underlying the torque detecting apparatus according to a second embodiment of the present invention.

This embodiment differs from the first embodiment in that the solenoid coil 5 and the detection circuit L of the latter are replaced by solenoid coils 50 and 51 and detection parts 65 and 75 of a different arrangement, respectively, as shown in FIG. 8.

More specifically, the solenoid coils 50 and 51 are disposed and connected in series to each other such that the currents flowing through the solenoid coils 50 and 51 are opposite to each other in the circumferential direction of the rotatable shaft. By disposing the solenoid coils 50 and 51 in this manner, the input coil 65 and the output coil 75 of the detection circuit L can be reduced in size. In other words, the coils 65 and 75 each can be implemented by using a small solenoid coil without using a U-like magnetic core as in the case of the first embodiment. It should also be noted that the coils 65 and 75 are disposed in opposition to each other at intermediate portions of the solenoid coils 50 and 51 with gaps being formed therebetween, respectively. In FIG. 8, reference numerals 651 and 751 denote magnetic cores while 652 and 752 denote electrically conductive wires, respectively.

The second embodiment provides such advantageous effects that the detection circuit L can be implemented in a reduced size with manufacturing costs being decreased correspondingly, in addition to advantages of the first embodiment.

Third Embodiment

In the torque detecting apparatus according to this embodiment, there are provided a metal core member 32 having a single disc-like core portion and a metal core member 34 having two disc-like core portions together with two independent oscillation circuits, as shown in FIGS. 9 to 14.

More specifically, the rotatable shaft portion 1 is provided with sensor coils 31 and 33 at an end portion 11 thereof, while the rotatable shaft portion 2 is provided with metal core members 32 and 34 at an end portion 21. The sensor coil 31 and the metal core member 32 cooperate to constitute a sensor unit Jx, while the sensor coil 33 and the metal core member 34 constitute a sensor unit Jy, wherein these sensor units Jx and Jy are fixedly mounted on the rotatable shaft at positions diametrically opposite to each other (refer to FIGS. 9, 11 and 12). The sensor unit Jx forms a first oscillation circuit in cooperation with an LC-series circuit Kx and a detection circuit Lx, while the sensor unit Jy constitutes a second oscillation circuit in cooperation with an LC-series circuit Ky and a detection circuit Ly. The structure of the sensor unit Jx itself is substantially same as that of the torque detecting apparatus according to the first or second embodiment of the invention.

Figure 9:
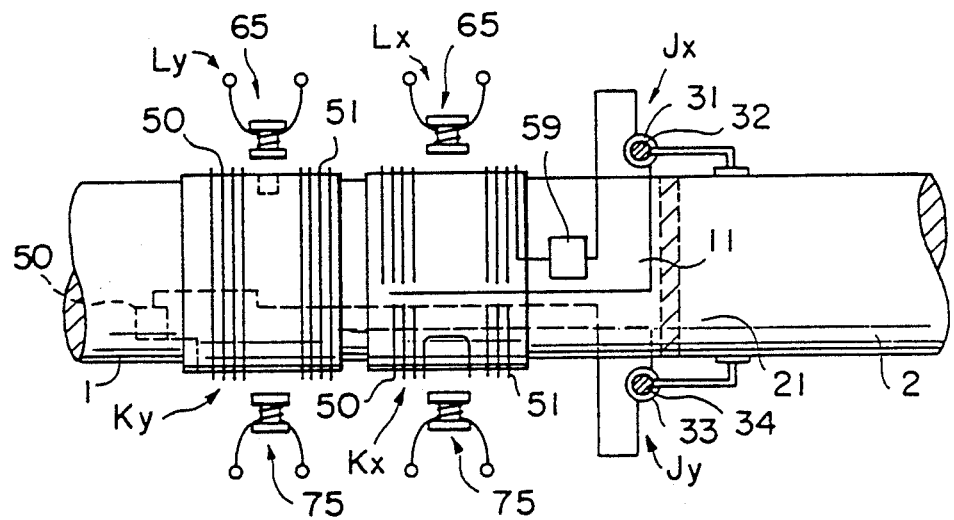
FIG. 9 is a schematic view for illustrating the concept underlying the torque detecting apparatus according to a third embodiment of the present invention.
Figure 11:
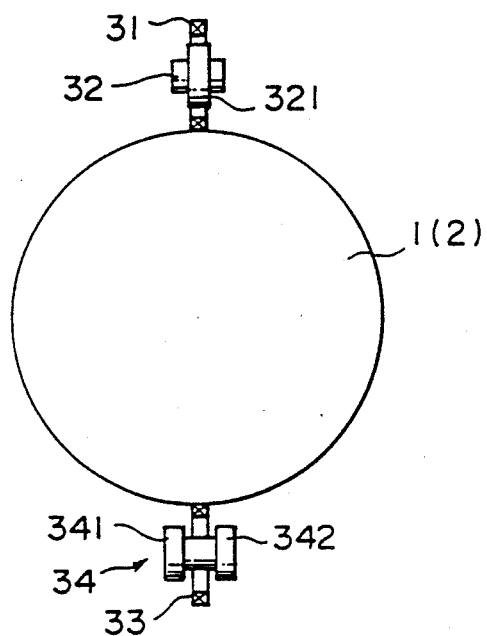
FIGS. 11 and 12 are views for illustrating a relative angular displacement between a sensor coil and a metal core member in the torque detecting apparatus shown in FIG. 9.
Figure 12:
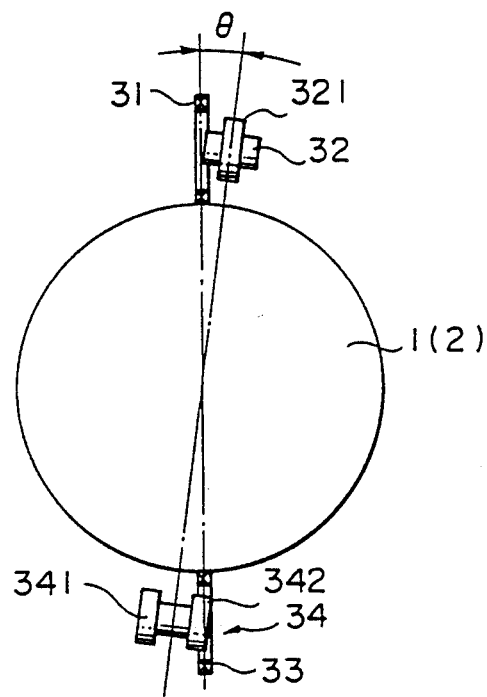
Figure 13:
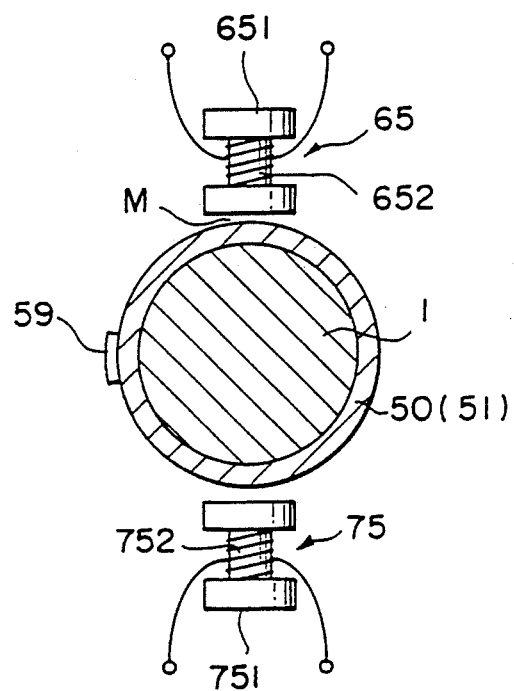
FIG. 13 is a sectional view showing a exemplary arrangement of the detecting unit in the torque detecting apparatus shown in FIG. 9.
Figure 15:
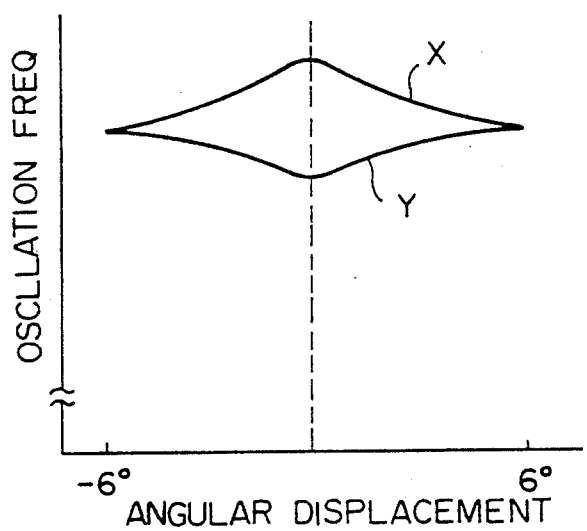
FIGS. 15 and 16 are views for graphically illustrating, respectively, a relation between angular displacement and oscillation frequency and a relation between angular displacement and difference of oscillation frequencies as realized in the torque detecting apparatus shown in FIG. 9.

Referring to FIGS. 9, 11 and 12, upon occurrence of a relative angular displacement due to torque applied to the rotatable shaft assembly, which is accompanied with displacement of the sensor coil 31 of the sensor unit Jx within the hollow space 313 of the detecting coil 31 in the axial direction thereof, as in the case of the first and second embodiments, the oscillation frequency of the first oscillation circuit undergoes the variation as indicated by a curve X in FIG. 15 (corresponding to the curve A shown in FIG. 7). In other words, the sensor unit Jx is connected in such a manner that when the disc-like core portion 321 of the metal core member 32 is moved away from the center position within the detecting coil 31, inductance of the sensor coil 31 is increased. Hereinafter, this type connection of the sensor unit will be referred to as a reverse phase connection.

Figure 10A:
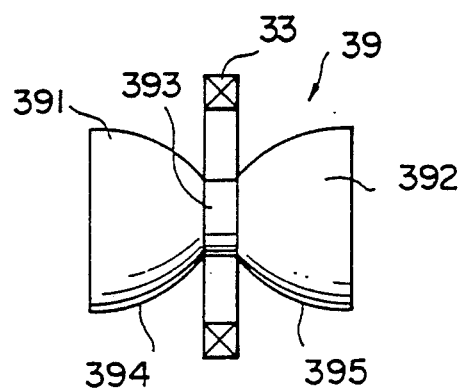
FIG. 10A is a schematic elevational view showing a modification of a metal core member constituting a part of the sensor unit shown in FIG. 10.
Figure 10:
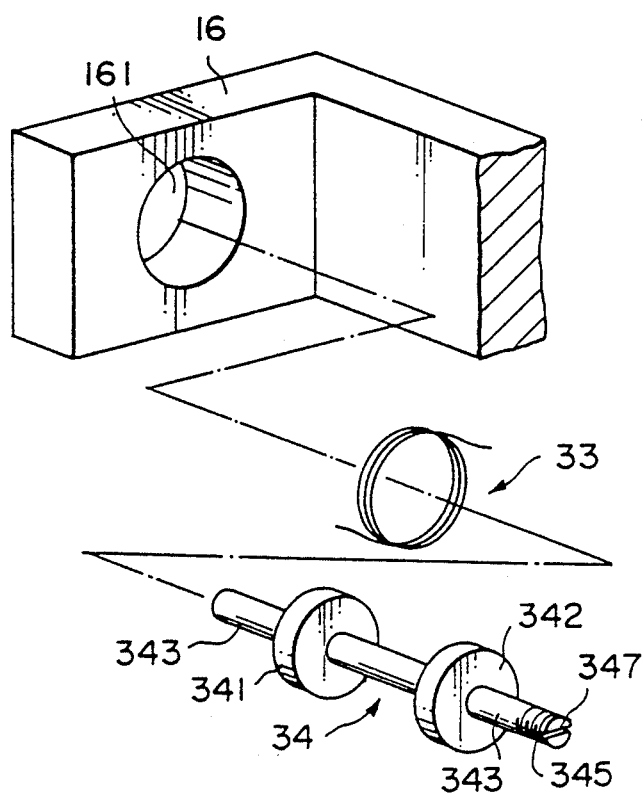
FIG. 10 is an exploded perspective view showing a sensor unit in the torque detecting apparatus shown in FIG. 9.

On the other hand, in the case of the sensor unit Jy, the sensor coil 33 is snugly fitted in a through-hole 161 formed in a mounting bracket 16 as in the case of the first embodiment, as can be seen in FIG. 10 (although not shown in FIG. 2 in conjunction with the first embodiment). Also, the metal core member 34 of the sensor unit Jy is provided with a pair of disc-like core portions 341 and 342 mounted on the shaft 343 (FIG. 10), in contrast to the metal core member 32 of the sensor part Jx. The shaft 343 is provided at one end thereof with a threaded portion 345 through which the shaft 343 is secured to a fixing bracket (not shown) and can be adjusted for setting the zero position.

With the abovementioned structure of the metal core member 34 of the sensor unit Jy, either one of the disc-like core portions 341 and 342 of the metal core member 34 is moved into the hollow space defined by the detecting coil 33 upon the occurrence of a relative angular displacement due to an application of torque. Consequently, as the relative angular displacement is increased, the oscillation frequency of the second oscillation circuitry is increased, as indicated by a curve Y in FIG. 15. In other words, the sensor unit Jy is connected in such a manner that when one of the disc-like core portions 341 and 342 moves close to the sensor coil 33, being accompanied with a corresponding increase in the relative angular displacement, inductance of the sensor coil 33 is decreased. Hereinafter, this type of connection will be referred to as a forward phase connection.

In the oscillation circuits described above (FIG. 14), the oscillation frequencies output from the detection circuits Lx and Ly are processed by respective shaper circuits Nx and Ny to be taken out as output signals fx and fy, respectively. Upon transmission of torque between the rotatable shaft portions 1 and 2, the relative angular positions thereof vary from the state illustrated in FIG. 11 to the state shown in FIG. 12, whereby a relative angular displacement $\theta$ is caused to appear, which in turn results in changes in the gaps between the sensor coils 31 and 33 and the metal core members 32 and 34, respectively, whereby inductances of the sensor coils 31 and 33 are caused to change correspondingly as described above.

At this time point, the sensor units Jx and Jy are connected in the reverse phase and in the forward phase, respectively, as mentioned hereinbefore. Accordingly, the relation between the angular displacement $\theta$ and the oscillation frequency can be represented by a curve X for the output fx of the oscillation circuit including the sensor unit Jx connected in the reverse phase and by a curve Y for the output fy originating in the sensor unit Jy connected in the forward phase.

Figure 16:
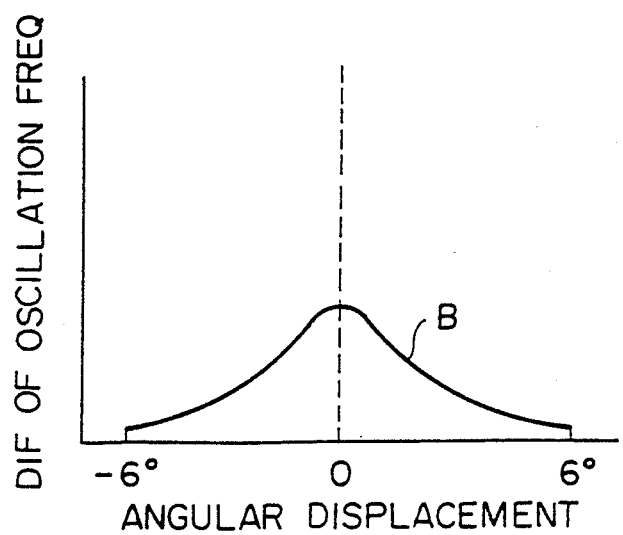

When the difference in the oscillation frequency (fx−fy) is to be utilized as a synthesized output signal, the relation of concern may be represented by a curve B shown in FIG. 16. This curve B shows substantially twice as great change as in the case where only one of the reverse or forward phase connections is used. In other words, by providing two sensor channels connected in the forward and reverse phases, respectively, it is possible to derive a synthesized output of an increased magnitude for a given angular displacement (difference in oscillation frequency between the two detection channels), which means that the measurement of torque can be performed with correspondingly enhanced accuracy.

As will be appreciated from the above description, the torque detecting apparatus according to the third embodiment of the invention can provide the advantageous effect that an output of increased magnitude is made available to ensure torque detection with a higher accuracy, in addition to the advantages of the first and second embodiments of the invention.

Figure 2A:
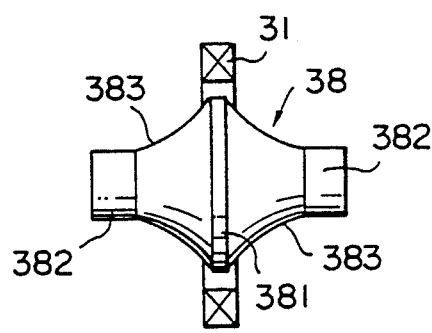
FIG. 2A is a schematic elevational view showing a modification of a metal core member constituting a part of the sensor unit shown in FIG. 2.

In the three embodiments described above, the first metal core member 32 having one core portion 321 is implemented in such a structure that the disc-like core portion 321 orthogonally intersects the shaft 322, as shown in FIG. 2. It should however be mentioned that the first metal core member may alternatively be realized in such a structure as shown in FIG. 2A and designated generally by a reference numeral 38. More specifically, the core member 38 shown in FIG. 2A is constituted by a core portion 381 having a maximum diameter and disposed at the center, end portions 382 of a reduced diameter, and concavely curved surfaces 383 interconnecting the center core portion 381 and the end portions 382 to one another.

Further, in conjunction with the third embodiment, the second metal core member 34 having the two core portions 341 and 342 is configured as shown in FIG. 10, wherein the disc-like core portions 341 and 342 orthogonally intersect the shaft 343 as in the case of the first metal core member 32. However, as a version of this embodiment, the second metal core member may be implemented in such a structure as shown in FIG. 10A and indicated generally by a reference numeral 39, which includes both end portions 391 and 392 of a maximum diameter, a center portion 393 of a reduced diameter and interconnecting portions 394 and 395 each having a convex-like curved surface.

Figure 15A:
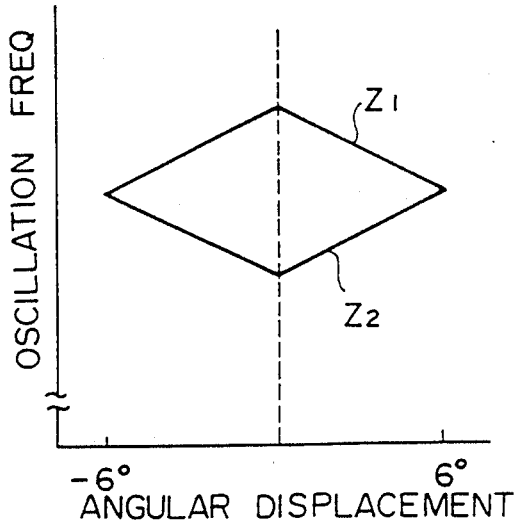
FIGS. 15A and 16A are views corresponding to FIGS. 15 and 16, respectively, for the cases where modified sensor units shown in FIGS. 2A and 10A are used.
Figure 14:
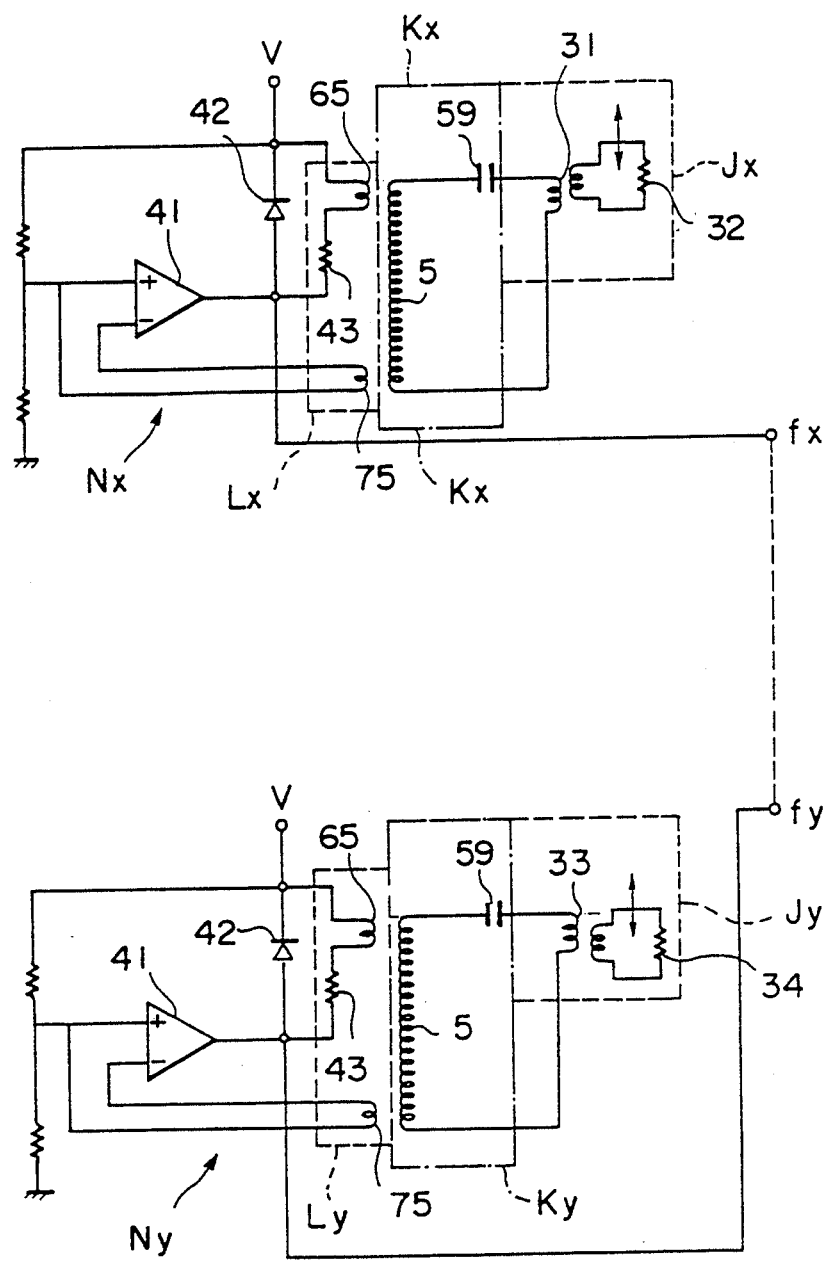
FIG. 14 is a circuit diagram showing an oscillation circuit employed in the torque detecting apparatus shown in FIG. 9.
Figure 16A:
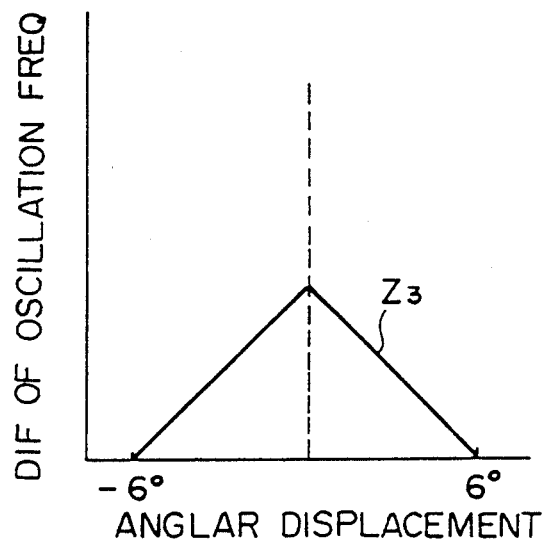

When both the metal core members 38 and 39 are employed in the torque detecting apparatus according to the third embodiment in place of the metal core members 32 and 34, respectively, with the metal core member 38, such oscillation frequency output characteristic as represented by a convex linear curve Z1 bending abruptly at the zero point can be obtained as shown in FIG. 15A, while for the metal core member 39, an oscillation frequency output characteristic is realized such as represented by a concave linear curve Z2 bending abruptly at the zero point (also shown in FIG. 15A). Thus, by determining the difference between output oscillation frequencies Z1 and Z2, as illustrated in FIG. 16, a synthesized output Z3 exhibiting a greater rate of change as a function of the angular displacement can be obtained as seen in FIG. 16A, whereby the accuracy of torque measurement can be improved correspondingly.

As will be understood from the above, the change in the oscillation frequency as a function of the angular displacement is linear when the metal core members 38 and 39 are employed in contrast to the case where the metal core members 32 and 34 shown in FIGS. 2 and 10 are employed. Such linearity of the output is attributable to the fact that the metal core member 38 has the concavely curved surface 383 with the metal core member 39 being imparted with the convexly curved surfaces 394 and 395. It goes without saying that these metal core members 38 and 39 are so implemented as to be susceptible to zero point adjustment, although illustration therefor is omitted.

In conjunction with the sizes of the sensor coil and the metal core member, it is preferred that the relationships mentioned below should exist in order to enhance the detection sensitivity. It should be noted that although the following discussion is made by reference to FIGS. 17A to 17C on the assumption that the metal core members shown in FIGS. 2 and 10 are employed, it is also applicable to the metal core members shown in FIGS. 2A and 10A.

Concerning the detection coil, it is generally preferred that the coil width a (FIG. 17C) should be comparable to a maximum amount of torsion taking place at the center of the detection coil in the axial direction thereof upon occurrence of a maximum relative angular dispacement $\theta$ (see FIG. 4) between the driving shaft and the driven shaft. That is, the width a has a relation given by $a \simeq (R+r)\theta$, where R represents the radius of the sensor coil and r represents the radius of the rotatable shaft from the center axis to the sensor coil mount surface.

Figure 17A:
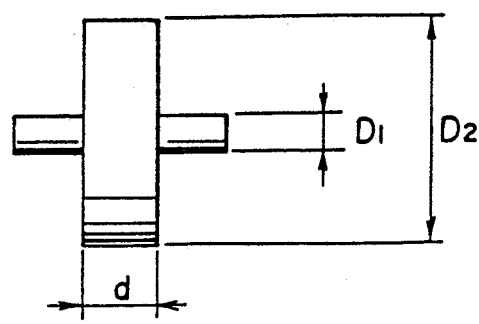
FIGS. 17A, 17B and 17C are schematic diagrams for elucidating the meaning of reference symbols representing various dimensions of a first core member, a second core member and sensor coil in the torque detecting apparatus according to the third embodiment of the invention.

Next, the size of the first metal core member illustrated in FIG. 17A should preferably be so dimensioned that the following conditions are satisfied:

$a/2 \leq d \leq 2a/3$, and $D_2 > 1.4 D_1$ where d represents the width of the center core portion having a maximum diameter, $D_2$ the maximum diameter, and $D_1$ the diameter of the reduced end portion of the core member. It has been experimentally established that with the above mentioned dimensional range, the torque detecting sensitivity can be enhanced as will be understood from FIG. 18.

Figure 17B:
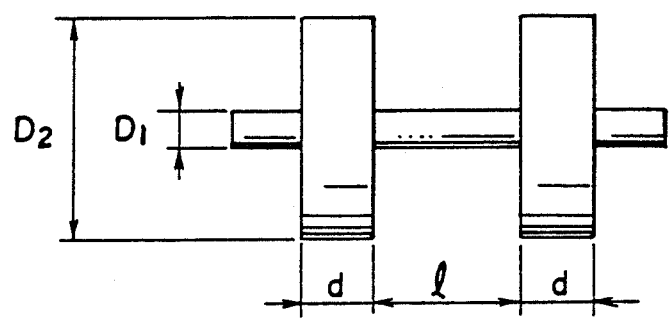
Figure 17C:
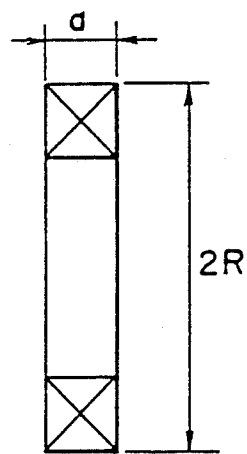

On the other hand, in the case of the second metal core member illustrated in FIG. 17B, the following conditions should preferably be satisfied:

$3a/2 \leq d \leq 2a$, $D_2 > 1.4 D_1$, and $2.2a \leq l \leq 2.4a$ where, as can be seen in FIG. 17B d, represents the width of the lateral core portions each having a maximum diameter, $D_2$ the maximum diameter, $D_1$ the diameter of the reduced interconnecting portion between the core portions of the maximum diameter, and l represents the distance between the maximum diameter core portions or the length of the reduced portion extending therebetween. With the above-mentioned range of sizes, it has been experimentally established that the torque detecting sensitivity can be enhanced, as will be understood from FIG. 19.

FIGS. 20 to 23 show a concrete example of the structure or disposition of the individual components constituting the torque detecting apparatus according to the third embodiment. More specifically, referring to FIG. 20, the torque detecting apparatus is installed within a housing 1b having a mounting flange 1a at one end and comprises a shaft-associated bobbin 15 threadedly mounted on the rotatable shaft 1 serving as a driving shaft and fixedly secured by a nut 1e, a rotor 22 mounted on the side of the rotatable shaft 2 serving as a driven shaft, a sensor coil 33 and a metal core member 34 mounted respectively on the bobbin 15 and the rotor 22, and other components, which are not explained herein as the concept of the present invention can be understood without an explanation thereof. Mounted at the other end of the housing 1b by means of bolts is an end plate 1c, from which a sleeve 1d extends coaxially with the rotatable shaft 1 so as to cover the latter.

Figure 20:
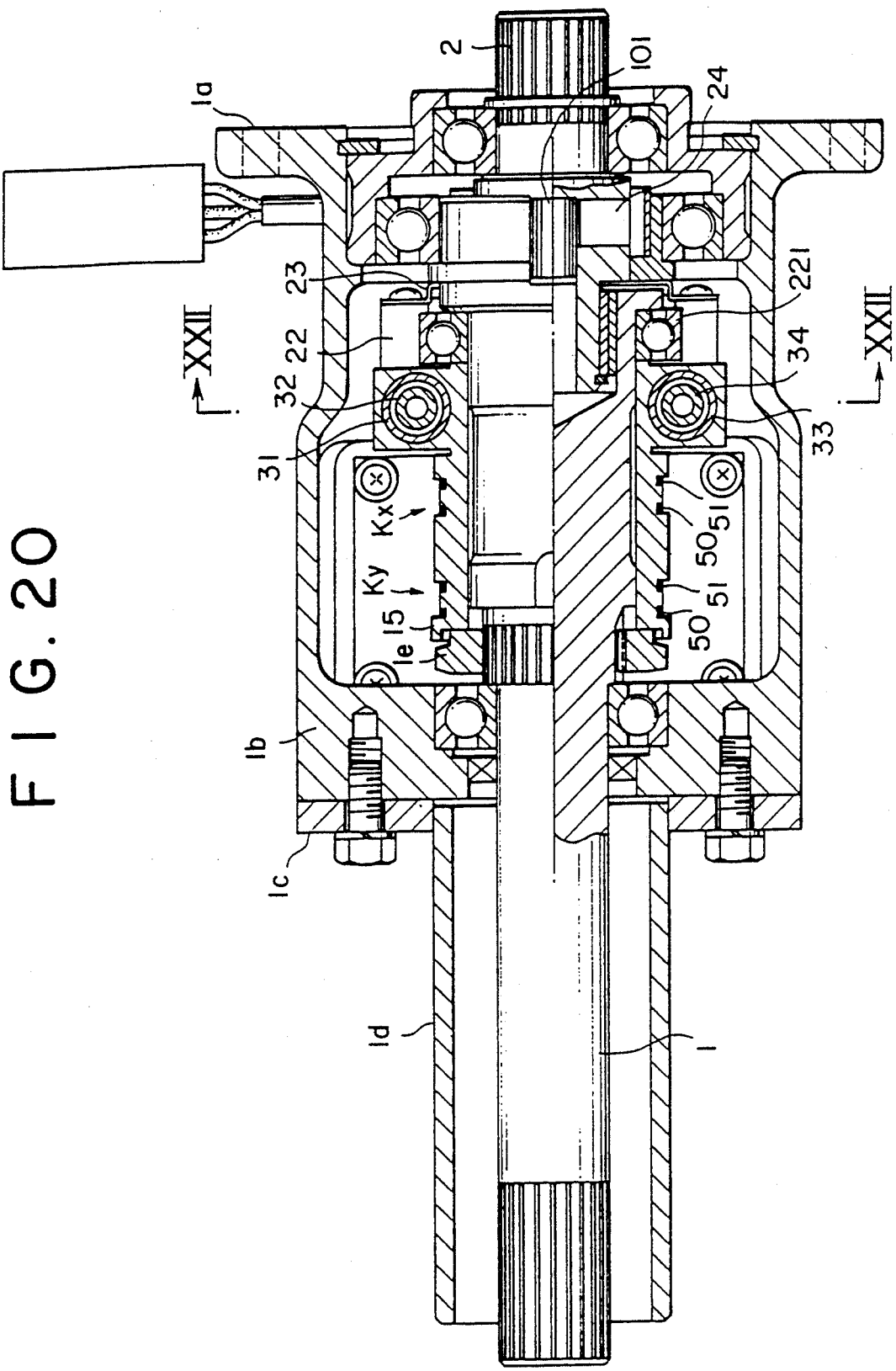
FIG. 20 is a longitudinal sectional view showing in concrete an exemplary structure of the torque detecting apparatus according to the third embodiment of the invention shown in FIGS. 9 to 14.
Figure 21:
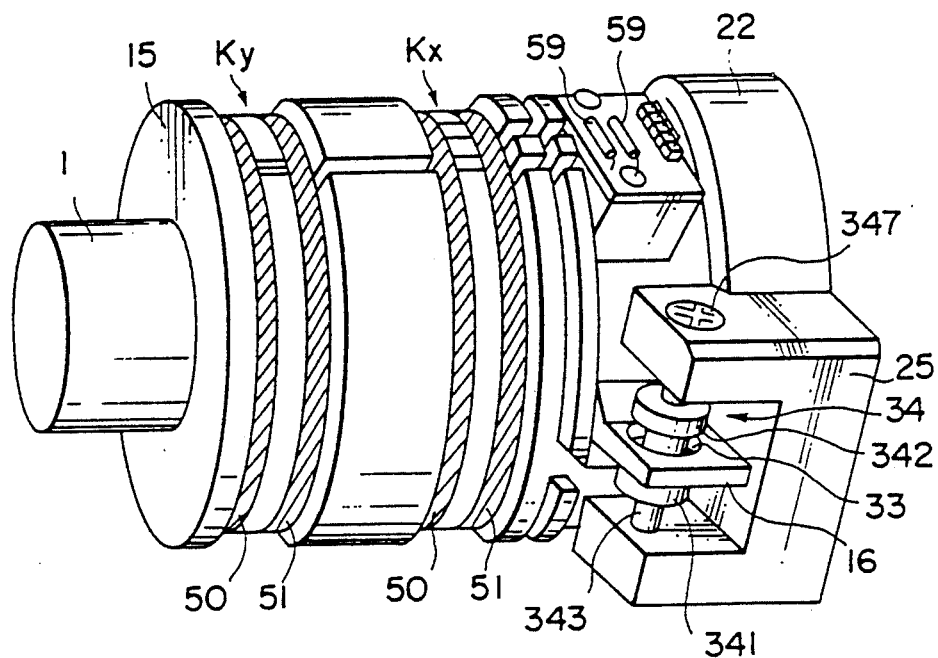
FIG. 21 is a prespective view showing a major portion of the torque detecting apparatus shown in FIG. 20.
Figure 22:
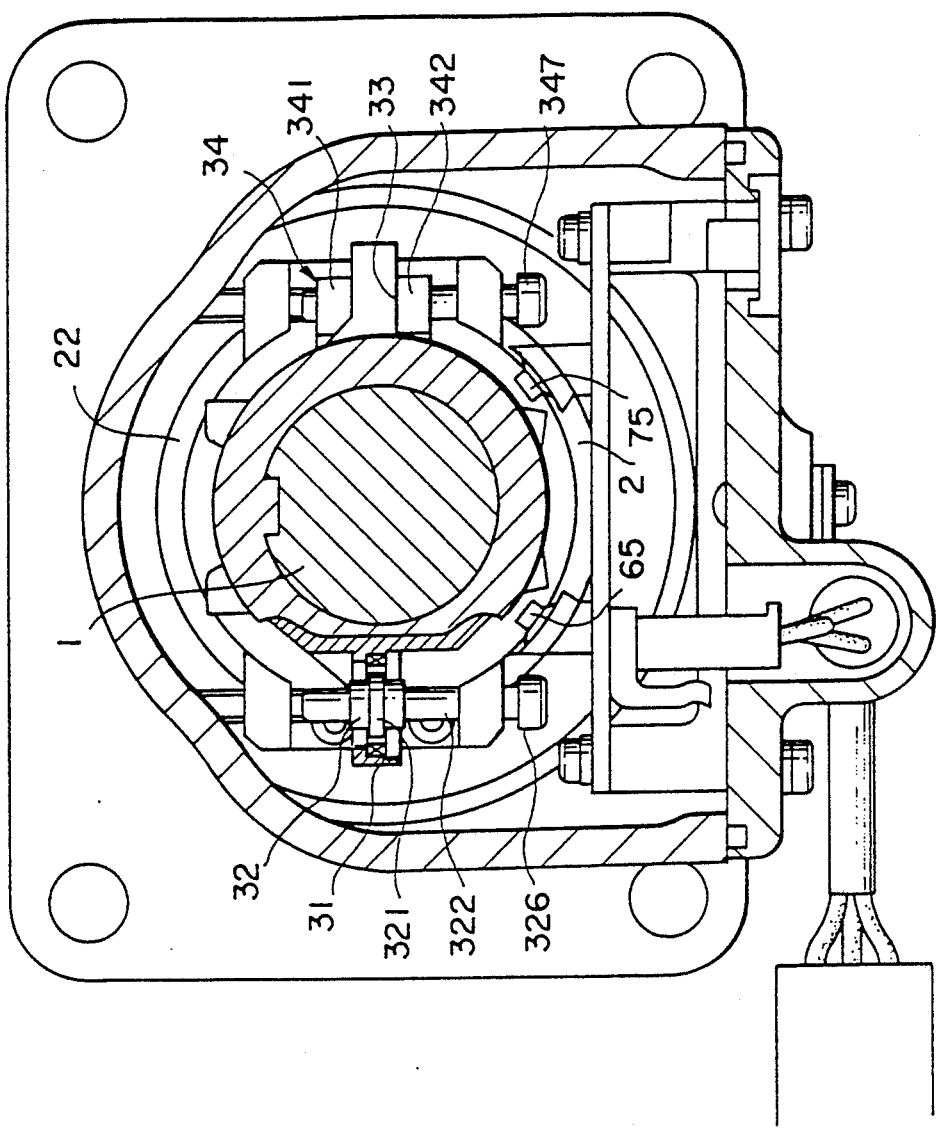
FIG. 22 is a sectional view taken along the line XXII—XXII in FIG. 21.

The shaft-associated bobbin 15 is provided with solenoid coils 50 and 51 of the LC-series circuits Kx and Ky described hereinbefore in conjunction with the third embodiment, which coils are wound around the bobbin 15 in a manner as illustrated in FIGS. 20 and 21. Also, the capacitors 59 are fixedly mounted on the bobbin 15. In association with the solenoid coils 50 and 51, the input coil 65 and the output coil 75 are disposed in opposition (refer to FIGS. 8 and 22), as described hereinbefore in conjunction with the second embodiment.

Further, the sensor coils 31 and 33 are disposed on the fitting member 16 provided on the bobbin 15 (see FIG. 21), while the metal core members 32 and 34 are disposed on a mounting bracket 25 provided in the rotor 22 (see FIG. 21). The sensor coils 31 and 33 are snugly fitted within the through-hole 161 (see FIG. 10) formed in the fixing member 16.

The metal core member 34 is movably mounted on the mounting bracket 25 at both ends of the shaft 343, as shown in FIG. 21. One end portion of the shaft 343 is threadedly mounted in the stationary frame 25. Accordingly, the zero point adjustment is performed by rotating the screw head 347 of the shaft 343 to thereby move the metal core member 34 substantially up or down in FIG. 21. The metal core member 32 is also moved in the same manner.

Figure 23:
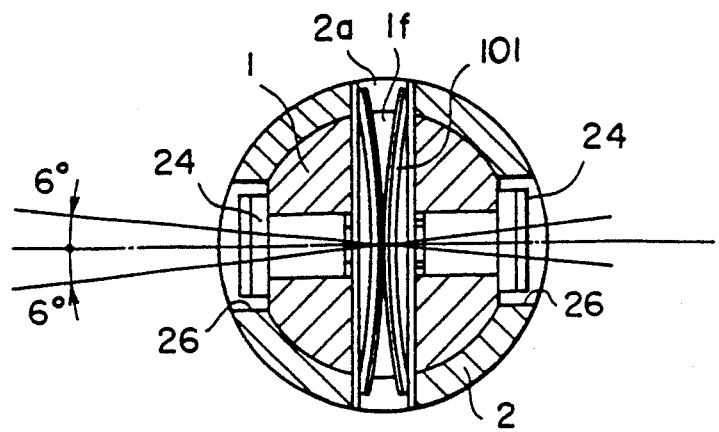
FIG. 23 is a sectional view showing a structure for coupling together a driving shaft portion and a driven shaft portion by means of a leaf spring assembly in the torque detecting apparatus shown in FIG. 20.
Figure 24:
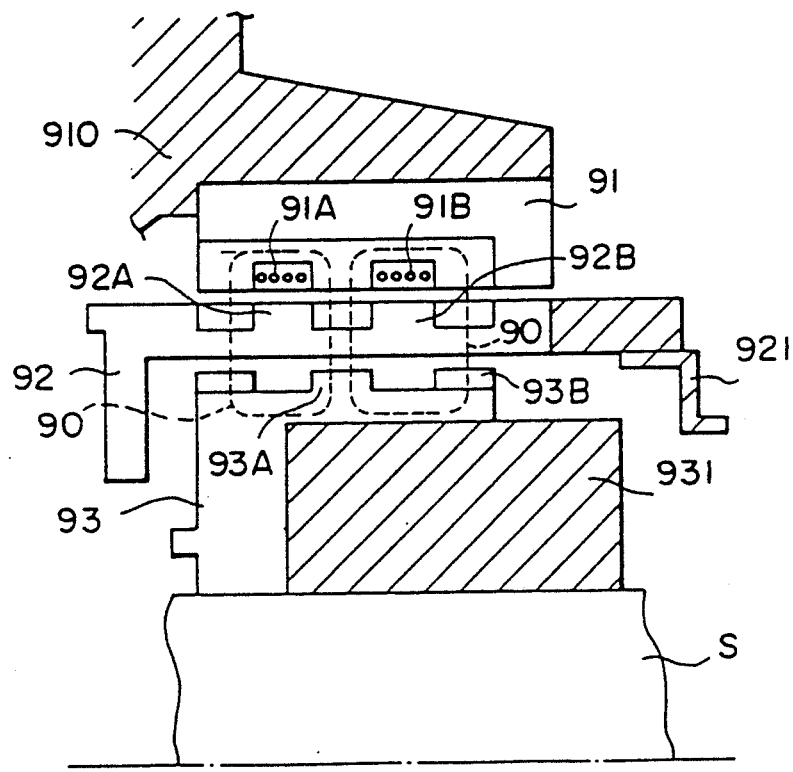
FIG. 24 is a sectional view showing a prior art torque detecting apparatus.
Figure 25:
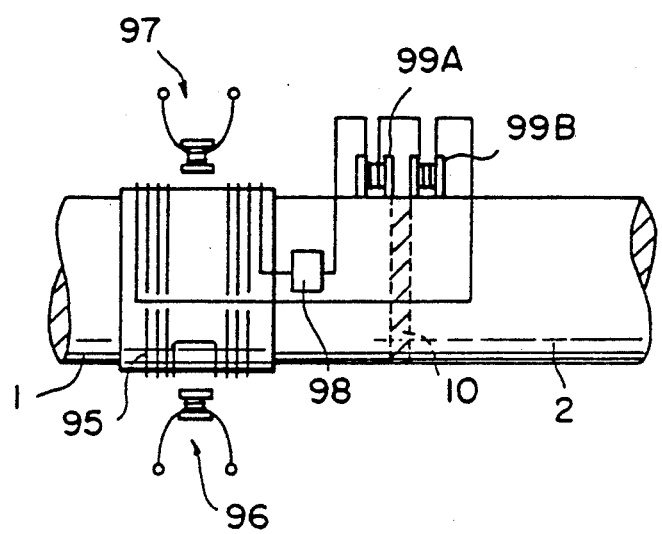
FIG. 25 is a conceptual view showing another torque detecting apparatus known heretofore.

An elastic leaf spring assembly 101 is interposed between the rotatable shafts 1 and 2, as shown in FIGS. 20 and 23. More specifically, the leaf spring assembly 101 is constituted by two pairs of flat leaf spring and corrugated leaf spring subassemblies. The subassemblies are inserted through a through-hole 1f formed diametrically in the end portion of the rotatable shaft 1 having a relatively smaller diameter so that both ends of the subassemblies project from the through-holes 1f, whereon the rotatable shaft 2 of a relatively larger diameter having a notch 2a formed in the end face is fitted into the rotatable shaft 1 with the projecting end portions of the subassemblies being received in the notch 2a, to thereby couple the shafts 1 and 2 through the interposed leaf spring assembly 101 so as to be capable of transmitting torque. Further, notched holes 26 are formed in the shaft 2 in diametrical opposition to each other so that pins diametrically extending through the rotatable shaft 1 and having diametrically enlarged portions 24 serving as a stop are inserted in the notched holes 26. The sizes of the notched hole 26 and the diametrically enlarged portion 24 are so selected that the maximum angle of relative angular displacement between the shafts 1 and 2 does not exceed six degrees. The rotor 22 is connected to the rotatable shaft 2 through a retainer 23 and a roller bearing 221 is interposed between the rotor 22 and the driving shaft 2.

Upon occurrence of a relative angular displacement due to torque transmitted between the shafts 1 and 2, positional displacements take place between the sensor coils 31, 33 and the metal core members 32, 34. Torque can then be detected on the basis of the positional displacements as explained in detail conjunction with the third embodiment.

It is thought that the present invention will be understood from the foregoing description and it will be apparent that various changes may be made in the form, construction and arrangement thereof without departing from the spirit and scope of the invention or sacrificing all of its material advantages, the forms hereinbefore described being merely preferred or exemplary embodiments thereof.

We claim:

1. A torque detecting apparatus for detecting torque applied to a rotatable shaft, comprising:

an annular bobbinless sensor coil disposed rotatably with the shaft and formed by winding an electrically conductive wire so as to define a hollow space;

a position-adjustable, non-ferromagnetic metal core member disposed rotatably with the shaft at a position adjacent said sensor coil, said core member being associated with said sensor coil so that when a relative angular displacement develops between said core member and said sensor coil upon twisting of the shaft in response to application of torque thereto, said core member is moved within the hollow space of said sensor coil to thereby change inductance of said sensor coil in corespondence to the relative angular displacement;

a capacitor mounted on the shaft;

solenoid coil means wound on said shaft and connected to said capacitor and said sensor coil to thereby constitute a resonance circuit; and detecting means including one set of an input coil and an ouput coil each comprising a magnetic core and an electrically conductive wire wound around said magnetic core, said input and output coils of said detecting means being disposed opposite said solenoid coil means in radially outwardly spaced relation with the outer periphery of the shaft, said detecting means forming, in cooperation with said resonance circuit, an oscillation circuit capable of oscillating at the resonant frequency of said resonance circuit for detecting the angular displacement corresponding to the torque in terms of change in the oscillation frequency.

2. A torque detecting apparatus according to claim 1, wherein said solenoid coil means comprises of pair of solenoid coils disposed such that directions of currents flowing in said pair of solenoid coils are opposite to each other in the circumferential direction of the shaft, said pair of solenoid coils being connected in series to each other.

3. A torque detecting apparatus according to claim 1, wherein said hollow space of said sensor coil lies on a plane containing the longitudinal axis of the rotatable shaft, said core member includes a core member shaft portion mounted on the rotatable shaft by mounting means, and a core position provided on the core member shaft portion, said core portion being adapted to move into and out of said hollow space.

4. A torque detecting apparatus according to claim 3, wherein said hollow space and said core portion are of a circular cross-section.

5. A torque detecting apparatus according to claim 3, wherein said core member shaft portion is formed with a threaded portion threadedly engageable with the mounting means, and wherein the position of said core portion relative to said hollow space of said sensor coil is changed by adjusting the degree of said engagement of said core member shaft portion with the mounting means with the aid of said threaded portion.

6. A torque detecting apparatus according to claim 3, wherein said metal core member is made of copper.

7. A torque detecting apparatus according to claim 3, wherein said core member shaft portion is substantially in the form of a cylinder having a relatively smaller diameter, and said core portion of said core member is in the form of a disc having a relatively larger diameter.

8. A torque detecting apparatus according to claim 3, wherein said core member shaft portion has reduced diameter portions located at both ends thereof, respectively, and concavely curved surface portions extending from said reduced diameter portions, respectively, toward said core portion.

9. A torque detecting apparatus according to claim 3, wherein a relation expressed by $$a \simeq (R+r)\theta$$

is present, where a represents the width of said sensor coil, R represents the radius of said sensor coil, $\theta$ represents the maximum angle of the angular displacement, and r represents the radial distance from the longitudinal axis of the rotatable shaft to a mount surface of said sensor coil.

10. A torque detecting apparatus according to claim 9, wherein relations expressed by $$a/2 \leq d \leq 2a/3;$$

and $$D_2 > 1.4 D_1;$$

are present, wherein d represents the width of said core portion of said core member, $D_2$ represents the diameter of said core portion, and $D_1$, represents the diameter of said core member shaft portion.

11. A torque detecting apparatus for detecting torque applied to a rotatable shaft, comprising:
first and second annular bobbinless sensor coils each disposed rotatably with the shaft and each formed by winding an electrically conductive wire so as to define a hollow space;
first and second non-ferromagnetic metal core members each disposed rotatably with said shaft, said first and second core members being associated with said first and second sensor coils, respectively, such that when relative angular displacements take place between said first and second core members and said first and second sensor coils, respectively, upon twisting of the shaft in response to application of torque thereto, said first and second core members are moved within the associated hollow spaces of said first and second sensor coils, respectively, to thereby change inductances of the associated sensor coils in correspondence to the relative angular displacements, respectively;
first and second capacitors mounted on the shaft;
first and second solenoid coil means wound on the shaft and connected to said first and second capacitors and said first and second sensor coils to thereby constitute resonance circuits, respectively;
first and second detecting means each including a set of an input coil and an output coil each of which is composed of a magnetic core and an electrically conductive wire would around said corresponding magnetic core, said input coils and said output coils of said first and second detecting means being disposed in opposition to said first and second solenoid coil means, respectively, in radially outwardly spaced relation with the outer periphery of the shaft, said first and second detecting means forming, in cooperation with said associated resonance circuits, oscillation circuits capable of oscillating at the resonant frequencies of said resonance circuits, respectively, for detecting the relative angular displacements corresponding to the torque in terms of changes in the oscillation frequencies.

12. A torque detecting apparatus according to claim 11, wherein each of said first and second solenoid coil means includes a pair of solenoid coils disposed and connected in series to each other such that directions of currents flowing in said pair of solenoid coils are opposite to each other in the circumferential direction of the shaft.

13. A torque detecting apparatus according to claim 11, wherein said hollow space of said first sensor coil lies on a plane containing the longitudinal axis of the rotatable shaft, said first core member includes a first core member shaft portion mounted on the rotatable shaft by mounting means, and a single core portion provided on said first core member shaft portion, said single core portion being adapted to move into and out of said hollow space.

14. A torque detecting apparatus according to claim 13, wherein said hollow space of said second sensor coil lies on a plane containing the longitudinal axis of the rotatable shaft, said second metal core member includes a second core member shaft portion mounted on said rotatable shaft by mounting means, and two axially spaced core portions provided on said second core member shaft portion and adapted to move in said hollow space of said second sensor coil substantially along the axis thereof.

15. A torque detecting apparatus according to claim 14, wherein said shaft portions of said first and second core members are each substantially in the form of a cylinder having a relatively smaller diameter, and said core portions of said first and second core members are each in the form of a disc having a relatively larger diameter.

16. A torque detecting apparatus according to claim 14, wherein said shaft portion of said first core member has reduced diameter portions located at both ends thereof, and concavely curved surface portions extending from said reduced diameter portions toward said single core portion.

17. A torque detecting apparatus according to claim 14, wherein a relation expressed by $$a \simeq (R+r)\theta$$

is present, where a represents the width of each of said first and second sensor coils, R represents the radius of each of said first and second sensor coils, $\theta$ represents the maximum angular displacement, and r represents the radial distance from the longitudinal axis of the rotatable shaft to mount surfaces of said first and second sensor coils, wherein for said first core member, relations expressed by $$a/2 \leq d \leq 2a/3;$$

and $$D_2 > 1.4 D_1$$

are present, and for said second core member, relations expressed by $$3a/2 \leq d \leq 2a;$$

$$D_2 > 1.4 D_1;$$

and $$2.2a \leq l \leq 2.4a$$

are present, where d represents the width of each of said core portions, $D_2$ represents the diameter of each of said core portions, $D_1$ represents the diameter of said shaft portions of said core members, and l represents the distance between said core portions of said second core member.

18. A torque detecting apparatus according to claim 14, wherein said first sensor coil and said first core member are disposed such that inductance of said first sensor coil is increased when said core portion of said first core member is moved away from the hollow space of said first sensor coil, while said second sensor coil and said second core member are disposed such that inductance of said second sensor coil is decreased, when one of said two core portions of said second core member moves close to the hollow space of said second sensor coil.

19. A torque detecting apparatus according to claim 11, wherein the rotatable shaft includes a driving shaft portion and a driven shaft portion coupled to each other through an interposed elastic member, and wherein said first and second sensor coils are mounted on said driving shaft portion with said first and second core members being mounted on said driven shaft portion.

* * * * *

UNITED STATES PATENT AND TRADEMARK OFFICE
CERTIFICATE OF CORRECTION

PATENT NO.  : 5,062,306
DATED       : November 5, 1991
INVENTOR(S) : S. Gotoh

It is certified that error appears in the above-identified patent and that said Letters Patent is hereby corrected as shown below:

Col. 4, line 10, "intergral" should read --integral--.

Col. 12, line 14, after "width", "a" should read --$\underline{a}$--; line 19, after "width", "a" should read --$\underline{a}$--.

Col. 14, line 29, "corespondence" should read --correspondence--; line 49, delete "of" (first occurrence), insert --a--.

Col. 15, line 24, "a" should read --$\underline{a}$--.

Col. 16, line 2, "would" should read --wound--; line 59, "a" should read --$\underline{a}$--.

Signed and Sealed this

Thirteenth Day of July, 1993

Attest:

MICHAEL K. KIRK

*Attesting Officer*  Acting Commissioner of Patents and Trademarks